(12) United States Patent
Kirshenbaum et al.

(10) Patent No.: US 8,627,403 B1
(45) Date of Patent: Jan. 7, 2014

(54) POLICY APPLICABILITY DETERMINATION

(75) Inventors: Evan R. Kirshenbaum, Mountain View, CA (US); Henri J. Suermondt, Sunnyvale, CA (US); Mark David Lillibridge, Palo Alto, CA (US); Kei Yuasa, Sunnyvale, CA (US); Kave Eshghi, Los Altos, CA (US); George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1664 days.

(21) Appl. No.: 11/831,342

(22) Filed: Jul. 31, 2007

(51) Int. Cl.
*H04L 29/06* (2006.01)

(52) U.S. Cl.
USPC ............................ 726/1; 726/11; 726/26

(58) Field of Classification Search
USPC .................................... 726/1, 11, 26
See application file for complete search history.

(56) References Cited

U.S. PATENT DOCUMENTS

| | | | | |
|---|---|---|---|---|
| 6,119,124 A * | 9/2000 | Broder et al. | ............................ | 1/1 |
| 6,263,364 B1 * | 7/2001 | Najork et al. | .................. | 709/217 |
| 6,349,296 B1 * | 2/2002 | Broder et al. | ............................ | 1/1 |
| 6,638,314 B1 * | 10/2003 | Meyerzon et al. | ............. | 715/234 |
| 6,775,665 B1 * | 8/2004 | Piersol | ................... | 1/1 |
| 6,839,680 B1 | 1/2005 | Liu et al. | | |
| 6,842,876 B2 | 1/2005 | Schilit et al. | | |
| 7,085,736 B2 | 8/2006 | Keezer et al. | | |
| 7,110,541 B1 * | 9/2006 | Lunt et al. | ......................... | 380/51 |
| 7,225,460 B2 * | 5/2007 | Barzilai et al. | ..................... | 726/1 |
| 7,328,401 B2 * | 2/2008 | Obata et al. | ................... | 715/205 |
| 7,594,277 B2 * | 9/2009 | Zhang et al. | .................... | 726/30 |
| 7,610,315 B2 * | 10/2009 | Chang et al. | ........................... | 1/1 |
| 7,739,746 B2 * | 6/2010 | Donahue | .......................... | 726/27 |
| 7,752,204 B2 * | 7/2010 | Kao et al. | ........................ | 707/736 |
| 7,761,498 B2 * | 7/2010 | Petry et al. | ...................... | 709/201 |
| 7,886,359 B2 * | 2/2011 | Jones et al. | ...................... | 726/26 |
| 7,996,373 B1 * | 8/2011 | Zoppas et al. | ................. | 707/694 |
| 8,225,371 B2 * | 7/2012 | Jones et al. | ........................ | 726/1 |
| 8,255,370 B1 * | 8/2012 | Zoppas et al. | ................. | 707/694 |
| 8,332,350 B2 * | 12/2012 | Pulfer et al. | ................... | 707/608 |
| 2003/0101449 A1 | 5/2003 | Bentolila et al. | | |

(Continued)

FOREIGN PATENT DOCUMENTS

JP 2003030221 1/2003

OTHER PUBLICATIONS

Bharat, Krishna and Broder, Andrei, "A technique for measuring the relative size and overlap of public Web search engines", In Proceedings of the 7th International World Wide Web Conference, Brisbane, Australia (WWW7), pp. 379-388. Elsevier Science, Apr. 1998, particularly Section 3.2.

(Continued)

*Primary Examiner* — Philip J. Chea (57) ABSTRACT

Provided are, among other things, systems, methods and techniques for determining applicability of a policy defined by reference to a source document. A first sketch that was generated based on content of the source document is obtained, and a matching criterion is defined based on the first sketch. Also obtained is a second sketch that was generated based on content of a potential target document. A determination is made as to whether the policy applies to the potential target document based on whether the second sketch satisfies the matching criterion and, if the policy applies, a notification regarding applicability of the policy automatically is provided and/or an action automatically is blocked so as to prevent a violation of the policy.

12 Claims, 6 Drawing Sheets

(56) References Cited

U.S. PATENT DOCUMENTS

| | | | | |
|---|---|---|---|---|
| 2003/0196094 | A1* | 10/2003 | Hillis et al. | 713/179 |
| 2004/0139059 | A1* | 7/2004 | Conroy et al. | 707/3 |
| 2004/0153515 | A1* | 8/2004 | Touboul et al. | 709/206 |
| 2004/0267721 | A1* | 12/2004 | Meyerzon et al. | 707/3 |
| 2005/0027723 | A1* | 2/2005 | Jones et al. | 707/100 |
| 2005/0060643 | A1* | 3/2005 | Glass et al. | 715/501.1 |
| 2005/0086252 | A1* | 4/2005 | Jones et al. | 707/102 |
| 2005/0165778 | A1* | 7/2005 | Obata et al. | 707/5 |
| 2005/0278270 | A1* | 12/2005 | Carr et al. | 706/25 |
| 2006/0005247 | A1* | 1/2006 | Zhang et al. | 726/26 |
| 2006/0036934 | A1* | 2/2006 | Fujiwara | 715/500 |
| 2007/0078900 | A1* | 4/2007 | Donahue | 707/200 |
| 2007/0083509 | A1* | 4/2007 | Wu et al. | 707/6 |
| 2007/0118518 | A1* | 5/2007 | Wu et al. | 707/5 |
| 2007/0174610 | A1* | 7/2007 | Furuya et al. | 713/167 |
| 2007/0174896 | A1* | 7/2007 | Furuya et al. | 726/1 |
| 2007/0208665 | A1* | 9/2007 | Ohara | 705/51 |
| 2007/0239998 | A1* | 10/2007 | Beck | 713/193 |
| 2008/0005221 | A1* | 1/2008 | Irlam et al. | 709/201 |
| 2008/0059448 | A1* | 3/2008 | Chang et al. | 707/5 |
| 2008/0059543 | A1* | 3/2008 | Engel | 707/204 |
| 2008/0071728 | A1* | 3/2008 | Lim | 707/1 |
| 2008/0126176 | A1 | 5/2008 | Iguchi | |
| 2008/0162455 | A1* | 7/2008 | Daga et al. | 707/5 |
| 2008/0162456 | A1* | 7/2008 | Daga et al. | 707/5 |
| 2008/0243820 | A1* | 10/2008 | Chang et al. | 707/5 |
| 2008/0270361 | A1* | 10/2008 | Meyer et al. | 707/3 |
| 2008/0281781 | A1* | 11/2008 | Zhao et al. | 707/3 |
| 2008/0319973 | A1* | 12/2008 | Thambiratnam et al. | 707/5 |
| 2009/0271839 | A1* | 10/2009 | Kanai et al. | 726/1 |

OTHER PUBLICATIONS

Buehrer, G., Parthasarathy, S., and Ghoting, A. 2006. Out-of-core frequent pattern mining on a commodity PC. In Proceedings of the 12th ACM SIGKDD international Conference on Knowledge Discovery and Data Mining (Philadelphia, PA, USA, Aug. 20-23, 2006). KDD '06. ACM Press, New York, NY, 86-95. DOI= http://doi.acm.org/10.1145/1150402.1150416.

H.H. Pang, B.C. Ooi, and L. I~ong. S-Hash: An indexing scheme for approximate subsequence matching in large sequence databases. Manuscript, Oct. 1997.

Printout on Nov. 19, 2008 of web page at http://www.orchestria.com/.

Printout on Nov. 19, 2008 of web page at http://www.orchestria.com/solutions/data_loss_prevention/.

Printout on Nov. 19, 2008 of web page at http://www.orchestria.com/products/network_control/.

Printout on Nov. 19, 2008 of web page at http://www.orchestria.com/products/message_server_control/.

Printout on Nov. 19, 2008 of web page at http://www.orchestria.com/products/endpoint_control/.

Printout on Nov. 19, 2008 of web page at http://www.orchestria.com/products/stored_data_control/.

Printout on Nov. 19, 2008 of web page at http://www.orchestria.com/products/review/.

Printout on Nov. 19, 2008 of web page at http://www.orchestria.com/solutions/messaging_compliance/.

Printout on Nov. 19, 2008 of web page at http://www.orchestria.com/solutions/information_classification/.

Printout on Nov. 19, 2008 of web page at http://www.wallstreetandtech.com/blog/archives/2007/01/orchestria_sign.html.

Printout on Nov. 19, 2008 of web page at http://www.wallstreetandtech.com/showArticle.jhtml?articleID=196903002.

Printout on Nov. 19, 2008 of web page at http://www.infoworld.com/article/07/02/16/08TCorch_1.html.

Printout on Nov. 19, 2008 of web page at http://www.infoworld.com/article/07/02/16/08TCorch_2.html.

Printout on Nov. 19, 2008 of web page at http://www.darkreading.com/security/perimeter/showArticle.jhtml?articleID=208804481.

Printout on Nov. 19, 2008 of web page at http://www.networkworld.com/cgi-bin/mailto/x.cgi?pagetosend=/export/home/httpd/htdocs/columnists/2007/051407edit.html&pagename=/columnists/2007/051407edit.html&pageurl=http://www.networkworld.com/columnists/2007/051407edit.html&site=printpage.

Printout on Nov. 19, 2008 of web page at http://www.processor.com/editorial/article.asp?article=articles%2Fp2922%2F21p22%2F21p22.asp.

Michael Rothschild, "The Most Dangerous Security Threats", IT Defense pp. 10-14, Jun. 2007.

Michael Rothschild "Securing the Borders of Electronic Communications", IT Defense pp. 21-22, Jun. 2007.

Printout on Nov. 19, 2008 of web page at http://blogs.zdnet.com/BTL/?p=5373.

Kit Robinson "Data Loss Prevention and HIPAA", PowerPoint produced by Vontu, Inc., dated 2006, printed out from http://www.ehcca.com/presentations/HIPAA12/5_03_2.ppt on Nov. 19, 2008.

Printout on Nov. 19, 2008 of web page at http://www.vontu.com/products/detection-accuracy.asp.

Printout on Nov. 19, 2008 of web page at http://www.vontu.com/products/.

Printout on Nov. 19, 2008 of web page at http://www.vontu.com/products/dlp_discover.asp.

Printout on Nov. 19, 2008 of web page at http://www.vontu.com/products/network-discover.asp.

Printout on Nov. 19, 2008 of web page at http://www.vontu.com/products/endpoint-discover.asp.

Printout on Nov. 19, 2008 of web page at http://www.vontu.com/products/dlp_monitor.asp.

Printout on Nov. 19, 2008 of web page at http://www.vontu.com/products/network-monitor.asp.

Printout on Nov. 19, 2008 of web page at http://www.vontu.com/products/endpoint-prevent-monitor.asp.

Printout on Nov. 19, 2008 of web page at http://www.vontu.com/products/dlp_protect.asp.

Printout on Nov. 19, 2008 of web page at http://www.vontu.com/products/network-prevent.asp.

Printout on Nov. 19, 2008 of web page at http://www.vontu.com/products/network-protect.asp.

Printout on Nov. 19, 2008 of web page at http://www.vontu.com/products/dlp_manage.asp.

Printout on Nov. 19, 2008 of web page at http://www.vontu.com/products/automation-workflow.asp.

Printout on Nov. 19, 2008 of web page at http://www.vontu.com/products/reporting-analytics.asp.

Printout on Nov. 19, 2008 of web page at http://www.vontu.com/products/management-security.asp.

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/ 2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India, 2008.

Shahabi et al.; "Yoda an Accurate and Scalable Web based Recommendation System?" University of Southern California, Los Angeles, Sep. 2001.

(56) References Cited

OTHER PUBLICATIONS

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

POLICY APPLICABILITY DETERMINATION

FIELD OF THE INVENTION

The present invention pertains to systems, methods, software programs and techniques for managing policies pertaining to electronic documents, e.g., within an organization.

BACKGROUND

Many companies have rapidly proliferating electronic documents and related content. In addition, there often are many policies that apply to such items. However, there exist a number of hurdles that often make it difficult to effectively manage such policies. To date, probably the most common approach has been notification and audit. Users get notified and educated about a policy (typically by email, in a training class or in a group meeting). Then, periodically, selected users get audited to test the extent to which they are in compliance. Such an audit itself typically is highly limited in scope, both as to the individuals who are being audited and to the kinds of violations that are detectable without incurring tremendous expense in individually examining large numbers of documents.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present application is related to the commonly assigned United States patent applications titled "Managing Electronic Document Policies" and "Policy Notifications" that are filed concurrently herewith, which applications are incorporated by reference herein as though set forth herein in full.

One application of the present invention is in connection with an automated system for managing policies pertaining to electronic documents, such as any of the systems described in the above-referenced patent application titled "Managing Electronic Document Policies". As described more fully therein, such a system preferably automatically checks applicability of a set of defined policies over an extended period of time. Upon detection that a particular policy applies (e.g., where there is a detected existing violation of the policy or where a determination has been made that an action is being taken that would result in a violation if completed), a notification automatically is delivered or some other specified action automatically is performed. In order to facilitate such a system, each policy preferably is written in a machine-readable format and includes a definition of its applicability (e.g., specifying the circumstances under which the policy is triggered) and a definition of the action(s) to be taken after applicability has been detected.

The present invention provides, among other things, improvements in how applicability of a policy can be defined (e.g., by a user), as well as improvements in how policy applicability is determined. The above-referenced patent application titled "Managing Electronic Document Policies" introduces the concept of automated management of electronic document policies in which applicability of desired policies can be defined by reference to one or more existing documents (sometimes referred to as "source documents").

One aspect of representative embodiments of the present invention is to allow a policymaker to define applicability of a policy with reference to particular characteristics of the content of particular source documents. For example, a policymaker might define the applicability of a particular policy as any document that is similar in some respect to a particular source document (or to any of the source documents within a defined set), with the specific kinds and/or degrees of similarity (in one or more respects) being precisely defined. Any document to which a particular policy applies generally is referred to herein as a "target document".

Figure 1:
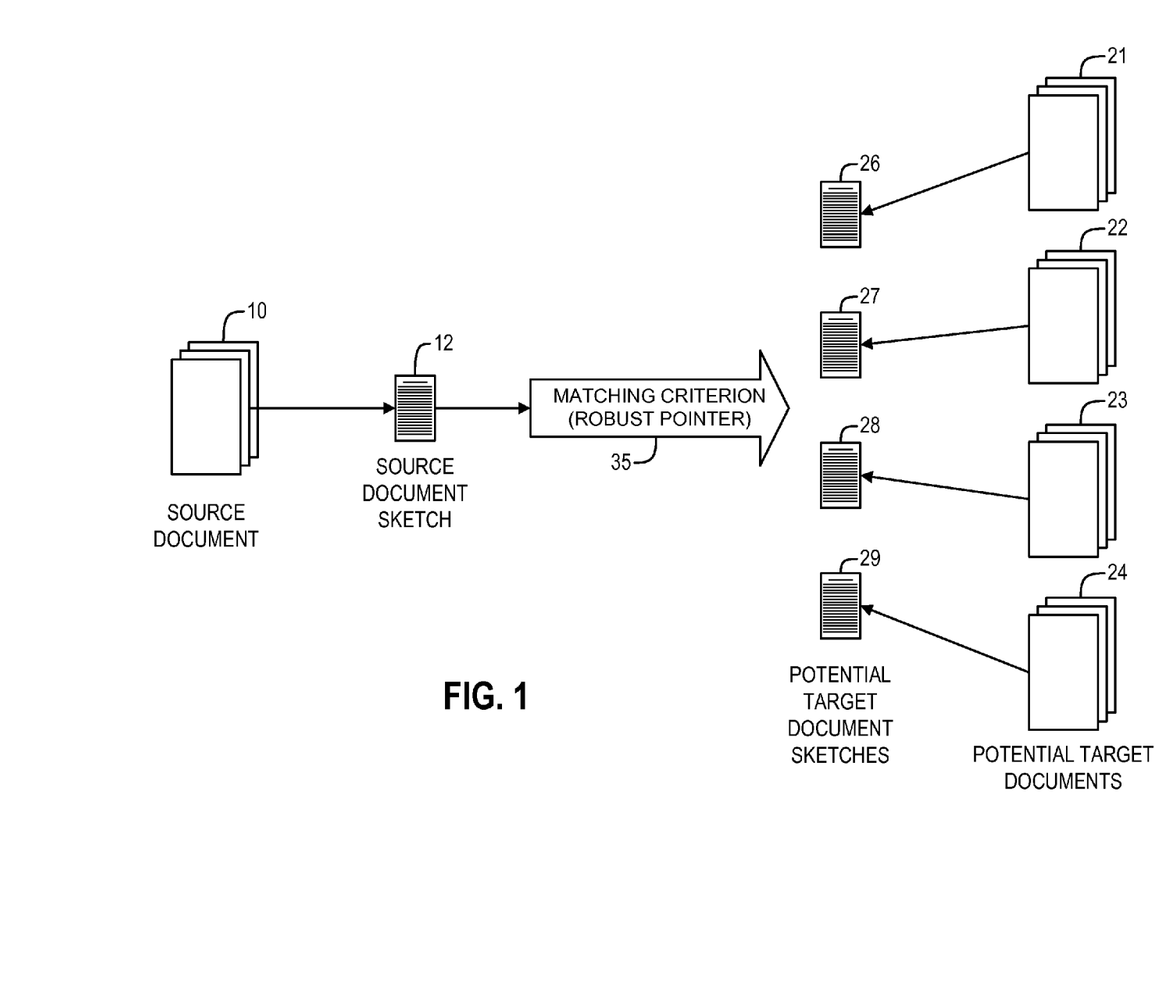
FIG. 1 is a block diagram illustrating a general approach to determining policy of applicability.

FIG. 1 is a block diagram illustrating a general approach to determining policy applicability according to a representative embodiment of the present invention. In this example, the source document 10 has been referenced by a policy whose applicability is being evaluated. In practice, a given policy might reference multiple source documents 10; however, in many cases each source document can be evaluated separately (e.g., where the policy is looking for any documents that are similar in some respect to any one of multiple identified source documents).

As shown in FIG. 1, a sketch 12 has been determined for the source document 10. In the preferred embodiments, the sketch 12 is a smaller document than source document 10 and is generated based on the content of source document 10. More preferably, sketch 12 is in some respect representative of source document 10. This concept is discussed in more detail below. In any event, however, sketch 12 preferably has been previously generated and pre-stored for source document 10 (prior to the evaluation process depicted in FIG. 1 and, in many cases, prior even to the creation of the policy).

There also exists a set of potential target documents 21-24 to which the present policy potentially will apply. The identification of potential target documents 21-24 is discussed in detail below. However, it should be noted that the number of potential target documents 21-24 can range from one or two documents to all of the documents existing on a computer system or in a data collection spanning multiple computer systems (e.g., hundreds of thousands, millions or even more documents).

Sketches 26-29 have been generated for potential target documents 21-24, respectively. In many cases, the process for generating sketches 26-29 will be the same as the process that was used for generating sketch 12. In fact, as discussed in more detail below, the sketches 12 and 26-29 preferably are generated in advance for large sets of documents and irrespective of source document and potential target document designations for particular policies. In any event, most of the same considerations preferably apply to sketches 26-29 for potential target documents 21-24 that applied to sketch 12 for the source document 10. That is, in the preferred embodiments, the sketches 26-29 are a smaller document than their corresponding documents 21-24, are generated based on the content of their corresponding documents 21-24, are in some respect representative of their corresponding documents 21-24 (or at least a portion thereof), and have been previously generated and pre-stored.

However, it should be noted that, while such considerations may be the same, in certain embodiments the sketch 12 itself often will be different than sketches 26-29. In certain such embodiments, for example, sketch 12 is only generated for a document 10 once the document 10 has been designated as a source document. In one particular sub-embodiment, a more or less generic source sketch (one that applies across all, or at least multiple, policies) is then generated, but the source sketch includes a greater amount of information, is more accurate or otherwise is more computationally expensive to generate than the pre-stored sketches for the potential target documents 21-24. In a different sub-embodiment, the source sketch is more specific to the particular policy definition that references the source document 10 (e.g., emphasizing certain portions of the source document 10 that have been highlighted as being important with respect to applicability of the policy).

In the preferred embodiments of the invention, at least a portion of the applicability of the policy under consideration is translated into a matching criterion 35, which determines whether at least that portion of the policy's applicability is satisfied by specifying a required relationship between a potential target document's sketch (e.g., any of sketches 26-29) and the sketch(es) 12 for the designated source document(s) 10. As shown in FIG. 1, such matching criterion frequently is referred to herein as a "robust pointer" 35 because it often is capable of identifying documents even if they have been modified to some extent.

The reasons for such "robustness" often can be twofold: first, because the sketches that pointer 35 compares include only selected information from their corresponding documents, even if the robust pointer 35 requires identity between the sketches, target documents generally will be identified as long as they differ only from the source document 10 in ways that are not captured by the applicable sketches; second, as discussed in more detail below, the robust pointer 35 itself preferably can be constructed so as to allow identification of target documents having sketches that are not strictly identical to sketch 12, but instead have some specified permissible deviations.

Figure 2:
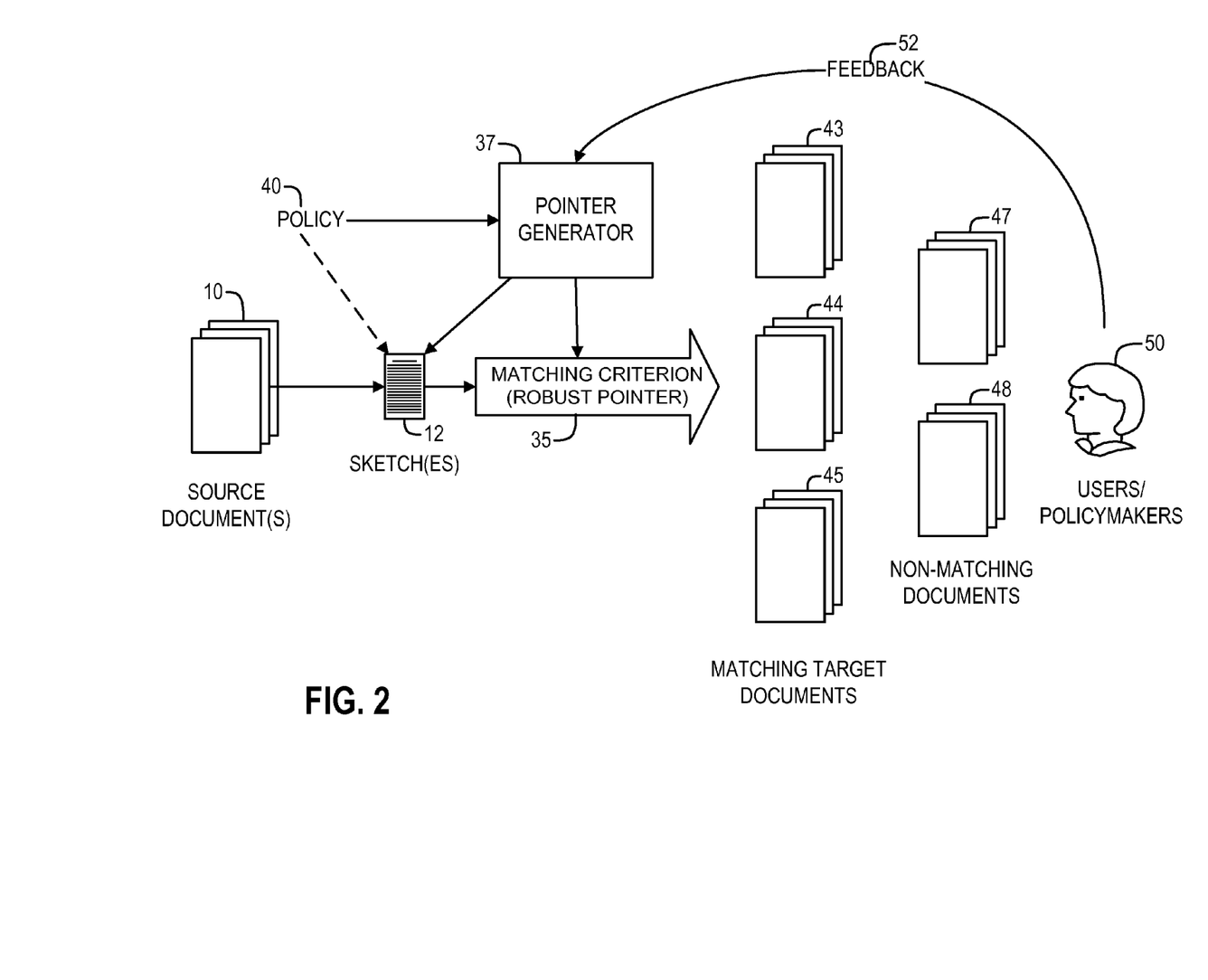
FIG. 2 is a block diagram showing generation and use of a matching criterion (or robust pointer)

FIG. 2 is a block diagram showing additional aspects of the creation and use of the robust pointer 35 in the preferred embodiments of the invention. As noted above, the robust pointer (or matching criterion) 35 preferably is defined by reference to one or more sketches 12 of corresponding source document(s) 10.

Here, robust pointer 35 is generated by a pointer-generating component 37, which preferably is fully automated, meaning that it can be implemented in software or in any of the other ways described herein. That is, pointer generator 37 preferably maps the portion of the applicability requirement specified in the subject policy 40 that pertains to source document(s) 10 to a robust pointer (or matching criterion) 35 that is defined by reference to the source document sketch(es) 12.

In addition, in situations where at least one of the referenced source document(s) 10 has multiple sketches, pointer generator 37 preferably selects the most appropriate sketch 12 (or set of sketches 12) to be used, again based on the subject policy 40. Thus, in such cases, irrespective of whether chosen by pointer generator 37 or a different component, the selected sketch 12 preferably is based on policy 40. In the preferred embodiments, policy 40 preferably has been written in XML, a declarative language or otherwise another language having a highly structured format.

The results of applying robust pointer 35 to a set of potential target documents (e.g., target documents 21-24) is to identify a subset of matching target documents 43-45, i.e., those potential target documents that match at least this portion of the applicability of policy 40. It is noted that the policy 40 can include other applicability criteria that are not defined by reference to any source document(s) 10. For example, a policy might be defined to be applicable to any document that is both similar in some respect to a specified source document 10 and that has a creation date (as indicated by the potential target document's other metadata) that is on or after a specified date. The present example only concerns identification of those potential target documents that satisfy the matching criterion 35. Considerations pertaining to other portions of policy applicability are described below. All documents that are not designated by robust pointer 35 are non-matching documents (e.g., documents 47-48).

Over time, the various users and policymakers 50 will observe the results of the robust pointer 35 (e.g., which documents were designated as matching target documents 43-45 and which were designated as non-matching documents 47-48) and provide feedback 52 to pointer generator 37. For example, if the robust pointer 35 has determined that the policy 40 is applicable to a particular matching target document 43, but the policymaker 50 subsequent determines that it should not have been (e.g., after the violation has been brought to her attention by the user who received notification of it), the policymaker 50 preferably provides the document 43 to pointer generator 37 (e.g., by clicking on a "not applicable" button on a provided user interface). In response, the pointer generator 37 preferably treats the document 43 as a negative example. Similarly, if the policymaker 50 becomes aware of a particular document 47 to which the policy 50 should have been applied but was not, the policymaker 50 preferably provides the document 47 to pointer generator 37, and the pointer generator 37 preferably treats the document 47 as a positive example.

It is noted that the entire notification and feedback process (e.g., from user to policymaker and from policymaker to pointer generator 37) preferably is fully automated. For example, the policymaker or user 50 preferably is provided with a simple user interface that displays each document for which applicability of policy 40 has been disputed and allows the policymaker/user 50 to click a button to confirm or contradict the applicability decision made in whole or in part by robust pointer 35. In the preferred embodiments, upon receiving the feedback information 52, the pointer generator 37 preferably modifies the robust pointer 35, e.g., using existing machine-learning techniques.

Similarly, if the feedback 52 indicates repeated errors that do not appear to be capable of correction by simply modifying robust pointer 35, such information 52 preferably is used to select a different sketch to be used as the basis for robust pointer 35 or, more commonly, to effect the generation of an entirely new sketch. In the latter case, the new sketch preferably is determined for each document in the system, or at least each document to which the sketch is applicable, and in some cases preferably is determined multiple times for different parts of a single document. For instance, if a sketch is only applicable to an image, then it preferably is determined only for documents that are, or include, images. At the same time, if a single document includes multiple images, then in certain embodiments the sketch is determined for each image in the document. Depending upon the particular embodiment, the actual generation of the new sketch can be performed automatically (e.g., using existing automated feature-selection techniques) or manually (e.g., by a user/policymaker 50 or by a separate individual who is a domain expert).

Figure 3:
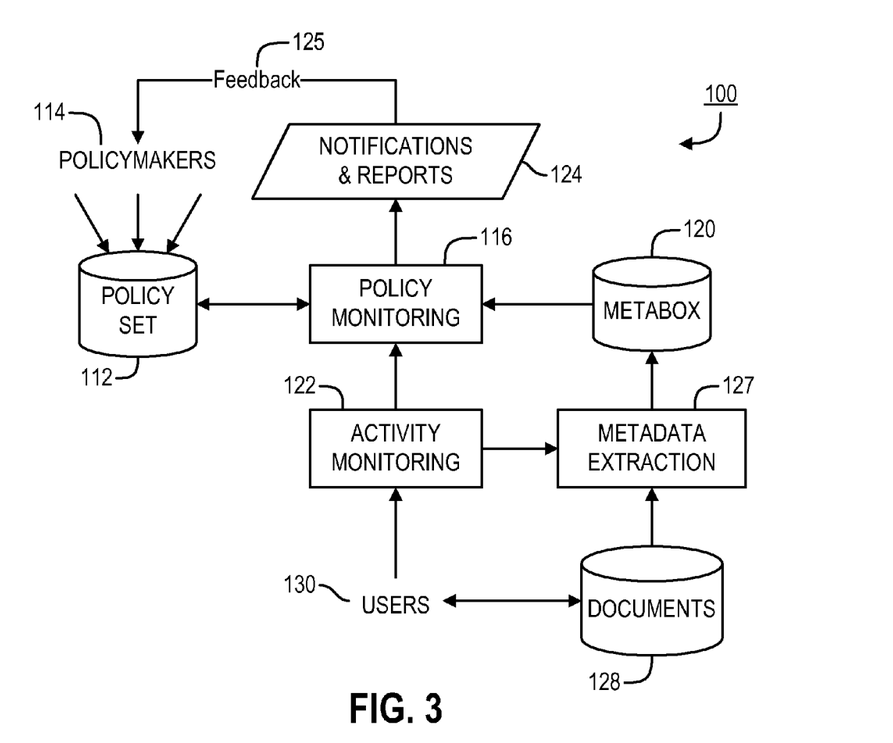
FIG. 3 is a block diagram of a system for managing electronic document policies.

FIG. 3 illustrates a block diagram of an exemplary system 100 for managing electronic document policies into which the document sketches (e.g., sketches 12 and 26-29) and robust pointers (e.g., robust pointer 35) of the present invention can be incorporated. One aspect of system 100 is a set of policies 112 covering various obligations, restrictions and other matters pertaining to electronic documents. Examples of such policies include: where specified documents may be located; who may have access to them; whether they can be edited, printed, copied or moved to a portable storage medium, e-mailed, or otherwise made available to someone outside the company; whether they should be backed-up; when they may or should be deleted; what format they may or should be in; and/or any other restrictions that one would like to impose with respect to electronic documents. In addition to the policies themselves, set 112 preferably also includes the generated robust pointers 35 associated with such policies.

In the preferred embodiments, all or most of the individual policies within set 112 include a definition of the documents to which they apply (i.e., the policy's applicability). Each such applicability preferably can include, e.g., references to particular users, references to particular documents (which, in turn, might be specified by reference to one or more authors and/or locations where documents are located, and/or by any other rule, in addition to or instead of naming specific documents) and/or references to particular activities, in any desired combinations. Thus, for example, a policy might specify that particular documents, or any documents that are similar in some respect to such particular documents, can only be located in the directories of certain designated users. Depending upon the specific embodiment, the precise definition of "similarity" for any given policy is specified in the policy itself and/or through follow-up queries made to the user, as discussed in more detail below.

A policy monitoring component 116 (which preferably also incorporates the functionality of pointer generator 37) accesses the policies within set 112 and determines whether individual policies apply and, if so, to which documents. For this purpose, monitoring component 116 preferably accesses a collection of metadata (generally referred to herein as a "metabox") 120 concerning electronic documents within the computer system for which policy compliance is being managed. In addition, in certain embodiments, monitoring component 116 also accesses real-time activity data that have been generated by activity monitoring component 122.

In this regard, the system 100 in the present embodiment contemplates the existence of a number of users 130 of an underlying computer system, which can include, e.g., any number and kinds of devices, typically connected together by one or more local area networks (LANs), wide area networks (WANs), virtual private networks (VPNs) or the like. Preferably, the computer system is defined so as to include all of the devices on which any electronic documents that are to be subject to the policies in set 112 exist. In many cases, most or all of such devices will share files with each other or otherwise be capable of communicating with each other, either on a substantially permanent basis (such as devices connected to a LAN) or on a relatively temporary basis (such as where a notebook-computer user logs onto a VPN on an as-needed basis). In certain embodiments, the computer system for which electronic document policies are being managed according to the present invention is a private network or computer system, in which document transfers to any publicly accessible sites are restricted, e.g., by policies 112. Additional discussion regarding system 100 and other examples of computer systems within which the systems, methods and techniques of the present invention can be implemented is provided in the above-referenced patent application titled "Managing Electronic Document Policies".

As generally indicated in FIG. 3, users 130 engage in a number of activities, including creating and editing various documents 128. Such documents 128 preferably include all possible source documents 10, as well as all possible potential target documents 21-24, and generally can exist anywhere on the computer system and in any of a variety of different formats. Generally speaking, most or all of the documents 128 will be user documents, e.g., documents that have primary associations with specific individual users or defined groups of users (often with the individual users and/or groups having different designated spaces on the computer system). However, the documents 128 often are accessible by others as well.

In addition, such user documents 128 generally will be working documents that are regularly generated, created and/or modified by the users 130 over time, e.g., as part of ongoing document authoring processes in the course of their ordinary activities for the organization that operates the computer system within which system 100 is implemented. Thus, although the set of documents 128 is shown in FIG. 3 as a single conceptual component, in practice the documents often will be spread across multiple different devices and multiple different folders and/or directories, e.g., corresponding to different users.

As used herein, the expression "document authoring" and any other derivations of the term "author" (e.g., when used as a verb or adjective) are intended to refer to the processes by which knowledge workers progressively create electronic documents (e.g., text, spreadsheet, image, audio, visual or multimedia documents) and/or modify such documents, with significant or substantial creative and/or intellectual input. Such authored documents are intended to be distinguished from the mere generation of an electronic document (e.g., by scanning a paper document or recording surveillance video) that involves little or no creative or intellectual input. In certain embodiments of the invention, a majority or more (e.g., at least 70-85%) of the documents 128 are authored documents, which often will include authored derivations of other documents. However, in some cases, documents (e.g., downloaded copies of MP3 files or installed programs) that have not been authored or altered in any manner by any of the users 30, as well as documents created automatically by programs in the course of their operation, will be included within set 128, and often there will be policies 112 that pertain to such documents.

References to documents 128 herein preferably refer to all documents that are covered by policy-management system 100. However, in certain embodiments, document set 128 refers to documents that are covered by a subset of the policies 112 (e.g., where such a subset of the policies 112 is applicable only to documents in a particular location, such as on a particular server). In such alternate embodiments, different sets of documents 128 can be defined for different subsets of the policies 112.

Also, it is noted that the term "document", as used herein, can encompass any separately identifiable data record or data chunk, such as documents that are recognized as separate files by the applicable operating system, records within a database, individual e-mail messages (even if stored collectively in a single file by the operating system), individual e-mail message attachments, and various data objects embedded into larger files or documents. The precise definition of what is included within the term "document" as used herein, preferably is within the discretion of the designers of the system 100, based on the wants and/or needs of the system's users.

As the documents 128 are created and modified, metadata for them preferably are extracted by metadata extraction component 127. In the various embodiments of the invention, such metadata might include, e.g., current storage location (which information can be accumulated over time, resulting in a history of where the document has been stored), identity of the user 130 who created or modified the document (which information also can be accumulated over time, in this case resulting in a history of all of the users 130 who have worked on the document), information regarding the changes made by the current user 130, derivation information indicating how the document originated or what was incorporated into it, tags or labels manually or automatically associated with the document (such as tags generated by an automated classifier), a hash or other representative, summary or abstraction information regarding the current contents of the document, and/or the context of its creation or acquisition (e.g., the program used to create it, the GPS location at which a picture was taken or the web site from which it was downloaded).

One particular kind of metadata that is generated (e.g., by metadata extraction component 127) in the preferred embodiments of the invention is sketch metadata (e.g., sketches 12 and 26-29). More preferably, metadata extraction component 127 generates sketches for all or substantially all of the documents 128. Moreover, in certain embodiments of the invention, multiple sketches are generated for individual documents within set 128. As discussed in more detail below, in some cases different sketches are generated so as to capture different aspects of a single document. In addition, or instead, in certain embodiments different sketches are generated for different portions of a single document. All of such sketches preferably are stored in metabox 120 after having been generated.

In addition to creating and modifying documents, users 130 preferably can engage in other activities, e.g., e-mailing documents, posting documents to a Web site or file transfer protocol (FTP) site, copying documents to removable storage media, printing documents, or the like. At least some of such other activities preferably are monitored by activity monitoring component 122 in order to identify significant events that might trigger the applicability of one or more policies within set 112. In a broad sense, some of such other activities also can be viewed as document creation and/or editing activities. However, these additional activities typically involve interactions between multiple documents and/or interactions with devices that are outside of the immediate computer system. In any event, the system 100 is intended to be flexible so that particular activities can be monitored by either or both of activity monitoring component 122 and metadata extraction component 127.

As illustrated in FIG. 3, activity monitoring component 122 preferably is capable of providing at least two main kinds of output. First, for specified activities performed by a user 130 that involve a document, metadata preferably are created by activity monitoring component 122 and supplied to metadata extraction component 127, for storing along with the other metadata for the document. For example, if a document has been e-mailed, metadata regarding the date, time and recipients preferably is created by activity monitoring component 122 and then stored in association with the document. Such metadata are likely to be useful during subsequent system scans, e.g., to identify whether any documents have been e-mailed in violation of an existing policy. Second, activity information preferably is provided directly from activity monitoring component 122 to policy monitoring component 116. Such information can be useful for real-time identifications of potential or attempted policy violations (e.g., where a particular policy is critical and it is desired to block any activity that potentially would violate it, or at least to provide a warning notification before the activity is performed).

In the preferred embodiments, metabox 120 is a separate logical unit that stores metadata for the documents 128. In one representative embodiment, metabox 120 is stored on a separate policy management server, together with policy set 112. In other embodiments, metabox 120 is distributed across several devices, e.g., with different kinds of metadata or metadata associated with different subcollections of documents on different devices. In any event, the metadata in metabox 120 preferably are stored within one or more indexes (e.g., reverse and/or inverted indexes).

One aspect of the monitoring performed by policy monitoring component 116 (e.g., checking for applicability of policies within policy set 112) preferably is pursuant to scheduled batch operations, such as full and/or partial scheduled system scans. In addition, or instead, in certain embodiments such checking is performed in real time, e.g., in response to designated events, such as an attempt to e-mail a document or copy it to a portable storage medium.

In the event that policy monitoring component 116 determines that an individual policy applies, notifications and/or reports preferably are delivered by notifications and reports component 124. More preferably, the notifications of any violations or potential/attempted violations are provided initially to the users 130 who are responsible for such violations or attempted violations. However, in alternate embodiments, or pursuant to an escalation procedure, notifications also may be provided to the managers of such users 130, to users responsible for enclosing locations (e.g., locations "above" the location of the violating document in the locations hierarchy), and/or to the actual policymakers 114. In addition, in certain embodiments a notification is provided to another component (e.g., software component) in the system requesting that a particular activity (e.g., one that would result in a critical violation) be prevented. In addition, in the preferred embodiments, reports (preferably summary reports) are provided to management and/or to the policymakers 114.

In certain embodiments of the invention, the notifications are provided electronically, and the users 130 have the ability to click an interface button indicating that the policy should not apply in the instant case, or to have applicability of the policy reviewed (e.g., by a manager or by the policymaker 114 who is responsible for the subject policy). In other embodiments, the provision of the notifications and reports 124 typically will trigger formal or informal feedback 125 (e.g., feedback 52) to the policymakers 114. Based on that feedback 125, such policymakers 114 might decide to alter a particular policy or withdraw it completely.

Preferably, policy monitoring component 116, activity monitoring component 122, notifications and reports component 124 and metadata extraction component 127 are fully automated, meaning that each can be implemented entirely in software or in any of the other ways described herein. Although each of such components is illustrated and discussed separately, it should be understood that the identification of separate components herein is merely to help conceptualize a representative system according to the present invention. In fact, the individual components may be merged and/or their functionality distributed across a number of different components (e.g., software components). For example, in one representative embodiment, functionality of the activity monitoring component 122 is distributed across a central coordinating software component, one or more operating systems and several software components, such as various applications (e.g., e-mail) and drivers (e.g., printer drivers) having activities to which at least one of the policies 112 pertains.

Figure 4:
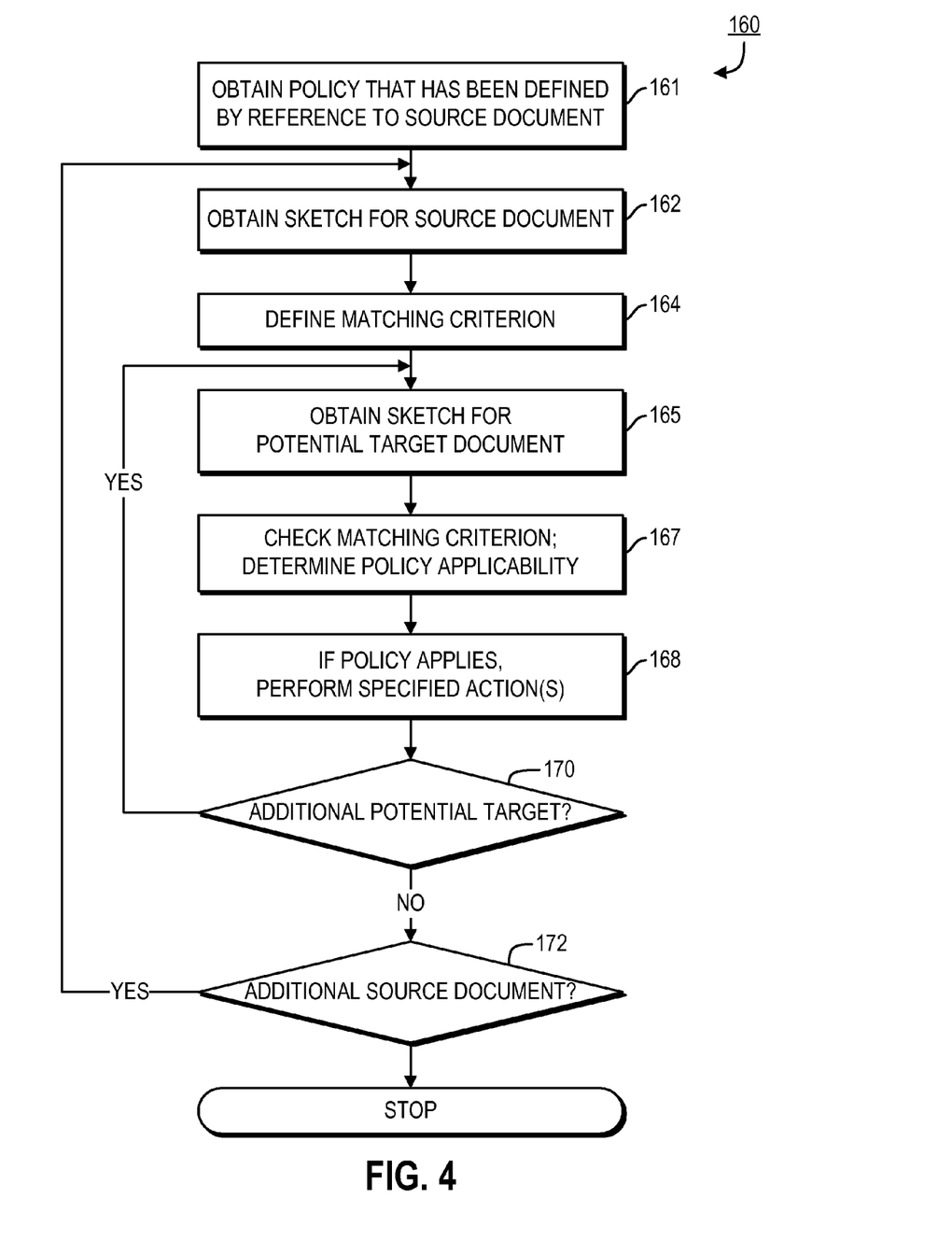
FIG. 4 is a flow diagram illustrating a method of determining policy applicability.

FIG. 4 is a flow diagram illustrating a method 160 of determining policy applicability according to a representative embodiment of the present invention. Initially, in step 161 a policy 40 whose applicability is to be evaluated is obtained. As indicated above, the policy 40 could have been selected pursuant to a systematic scan of the entire computer system, in which all or a large number of the policies 112 are being checked against the documents 128 in order to identify violations and/or other instances of policy applicability. Alternatively, some other triggering event (e.g., an attempt to send an e-mail message) could have caused a particular policy 40 to be evaluated relative to one or more documents within set 128. In either event, in the present example the applicability of the policy 40 is defined (at least in part) by reference to some source document(s) 10. In addition, the policy 40 indicates (either generally or specifically) some desired relationship between the source document(s) 10 and any matching target documents.

In step 162, a sketch is obtained for each of the designated source document(s) 10. For example, referring to FIG. 5, in one embodiment, a variety of different kinds of alternate sketches 201-205 previously have been generated for a particular source document 10, depending, e.g., upon any or all of: the kind of information the document contains (e.g., text, image, audio, visual, graphic, composite), the format of the document (e.g., Word, PowerPoint, PDF, JPEG), the kinds of policies with which the sketch is intended to be used (e.g., finding documents that have text that is similar in some respect to the text in the source document 10, finding documents that include an image that is at least similar in some respect to the source document 10, which is in image file), the owner of the document, the sensitivity level of the document, the application that created the document, whether the document is in a public location, and the purposes for which the document has been used.

Figure 5:
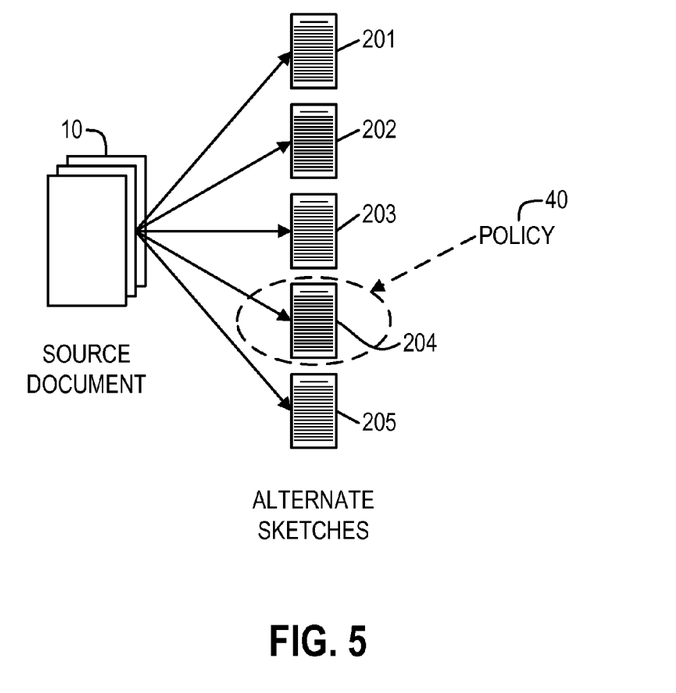
FIG. 5 illustrates selection of a sketch to use for a particular policy from among a plurality of alternate sketches that are available for a designated source document.

The following are certain more-specific examples of the kinds of sketches that are contemplated to be generated according to the present invention. In each case, the sketch can be generated either for an entire document or for identified portions of a document (e.g., each paragraph of a text document or each image within a composite document). It is noted that each such portion of an individual file is defined as a separate document in certain embodiments of the invention. In order to simplify the discussion, in the following descriptions it is assumed that the sketch is being applied to a single entire document.

One approach to generating a sketch, which is applicable to documents that include text, identifies a list of words or other terms, or any other term-related feature (e.g., phrase, sequence, e-mail address, matched regular expression, frequency of term above threshold, absence of term, etc.) that represents the document in some respect. For instance, the list might be generated using an existing automated keyword-generation process, potentially limiting the results to the most significant N terms (e.g., N being based on storage, processing and/or accuracy considerations). Alternatively, following an approach that has been used to evaluate similarity of Web pages in order to determine coverage of Web search engines, the list might be generated by selecting the N words in the document that occur least frequently in a selected lexicon (in this case, e.g., N having a value between 8 and 20, inclusive). See, e.g., Bharat, Krishna and Broder, Andrei, "A technique for measuring the relative size and overlap of public Web search engines", In Proceedings of the 7th International World Wide Web Conference, Brisbane, Australia (WWW7), pages 379-388. Elsevier Science, April 1998. Still further, the list might be generated using a combination of these approaches (e.g., based on frequency and/or prominence of occurrence within the document and infrequency of occurrence within a selected lexicon).

Another approach to generating a sketch uses hashes, either hard (cryptographic) hashes such as MD5 or soft (approximate) hashes. Preferably, a hard-hash technique determines hashes for individual chunks of data within the document, and a soft-hash technique is used either for the document as a whole or for individual chunks of data within the document. Certain discussions in this regard are included in commonly assigned U.S. patent application Ser. No. 11/546,235 filed Oct. 11, 2006, and titled "Producing Representative Hashes for Segments of a File", which application is incorporated by reference herein as though set forth herein in full. Other representative approaches use, e.g., any of the techniques for identifying near duplicate documents (such as described in the Wikipedia online encyclopedia under the title "Near Duplicate Algorithms").

A still further approach to generating a sketch, which is applicable to a document that is (or includes) an image, is to generate a set of information that characterizes one or more aspects of the image. Examples include simply saving a low-resolution version of the image, identifying and saving only the edges within the image (e.g., using an existing edge-detection technique), using feature selection to identify and save information regarding a set of features within the image and their spatial relationships to each other, and/or saving statistics regarding color distributions, intensity distributions or the like.

In the event that multiple sketches 201-205 exist for a single source document 10, one or more of the sketches (e.g., sketch 204) preferably is selected (e.g., by pointer generator 37) based on the policy 40 that was obtained in step 161. For example, policy 40 might explicitly designate the specific sketch to be used (e.g., based on one or more types of sketches that have been selected by the policymaker 114 from a drop-down list during the creation of the policy). If not, the nature of the source document 10 preferably first is used to determine which sketch 12 to use. For example, if the source document 10 includes only text and there is only a single sketch that is applicable to text documents, then that sketch is selected.

Alternatively, in certain embodiments the policymaker 114 is queried through a user interface to identify those aspects of the source document 10 that are most important in connection with the applicability of the policy 40, e.g., by selecting from among pre-specified pre-stored characteristics of each sketch and/or by selecting particular portions of the source document 10 that are deemed most important. It is noted that the identification of the kind of sketch to be used when determining applicability of a particular policy 40 can be made at the time the policy is written or any time thereafter. As a result, e.g., in certain embodiments pointer generator 37 communicates with the policymaker 114 once and in real-time (e.g., when the policy is being submitted) to obtain any relevant additional information. In any event, the actual sketch(es) 12, or the types of sketch(es) (from which the actual sketch(es) 12 are selected), preferably are selected only once for each new policy 40.

In step 164, the matching criterion (or robust pointer) 35 is defined, e.g., by pointer generator 37. Once again, the criterion 35 can be determined at the time the policy is written or any time thereafter, so again it is possible to interact with the policymaker 114 in order to obtain any relevant additional information. Ordinarily, the policy 40 has been written so as to encompass documents that are identical or similar in some respect to one or more designated source documents 10. In such cases, one question is how such "similarity" is to be specified. As noted above, the sketch itself sometimes will be adequate to encompass the desired similarity, so that the process need only look for identically matching sketches. In other cases, the question can be stated as, "How close should the target document sketch be to the sketch for the source document 10, and what is the relative importance of the various kinds of differences that might exist?"

The required closeness between the sketch 12 for a particular source document 10 and a matching target document 43-45 can be specified as a single maximum distance, which in turn preferably is specified by the policymaker 114, either during the initial creation of the policy 40 or through a user interface upon submission of the policy, as described above. For example, in one embodiment, the presented graphical user interface includes a slider which is dragged by the policymaker 114 to select the desired maximum distance. In a more specific example, in which the applicable sketch 12 includes a number of representative words, terms, image features or the like in the source document 10, the policymaker 114 drags the slider to indicate how many of such representative elements must occur in the target document.

Figure 6:
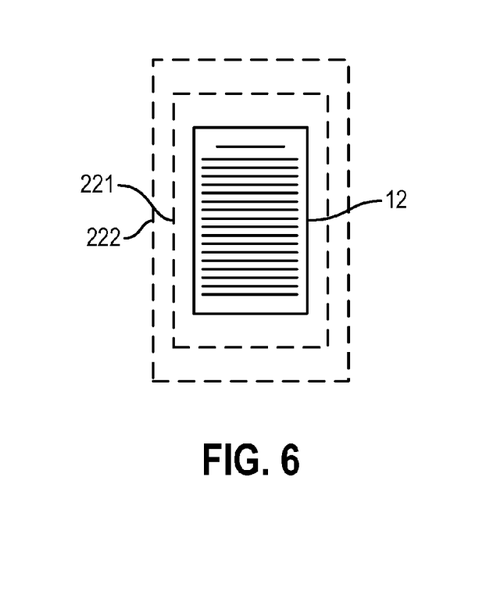
FIG. 6 illustrates different specified distance measures with respect to a designated source document, for purposes of defining a robust pointer.

More generally, the slider allows the policymaker 114 to adjust the specificity, sensitivity or accuracy with which target documents are identified. The result of choosing different values for such a scalar measure of distance is illustrated conceptually in FIG. 6, in which individual points on a two-dimensional plane correspond to different documents and the horizontal and vertical directions correspond to measures with respect to two different criteria, with the chosen scalar value influencing both in lockstep. Starting from the sketch 12 for the source document 10, specification of increasing distance more or less uniformly expands the scope of target documents that are encompassed. Thus, scope 221 corresponds to a designated distance measure and scope 222 corresponds to a larger designated distance measure.

Alternatively, in certain embodiments distance is specified (at least in part) in a non-uniform or directional matter. For example, in one representative embodiment the matching criterion 35 is defined with respect to a score in which different features of sketch 12 have different levels of significance. In a more specific example, if the sketch 12 includes a set of representative elements (e.g., words, terms, image features or the like), each such representative element is assigned a weight and a score is determined for a potential target document by summing up the weights for each represents the element that it includes (or, alternatively, also based on frequency of occurrence for such representative elements within the potential target document). Then, e.g., if the score for a document exceeds a specified threshold, it is selected as a matching target document.

Emphasizing different aspects of the sketch 12 more than others has the effect of specifying not only how close the sketch for the target document needs to be, but also in what respects. Thus, as conceptually shown in FIGS. 7 and 8, multiple different scopes 241 and 242 (each encompassing all target documents enclosed within it) having roughly the same size (i.e., encompassing roughly the same number of documents) can be defined by emphasizing different aspects of the sketch 12. Specifically, in FIG. 7 target documents need to be more similar to the source with respect to the criterion corresponding to the horizontal direction, and in FIG. 8 target documents need to be more similar to the source with respect to the criterion corresponding to the vertical direction.

Figure 7:
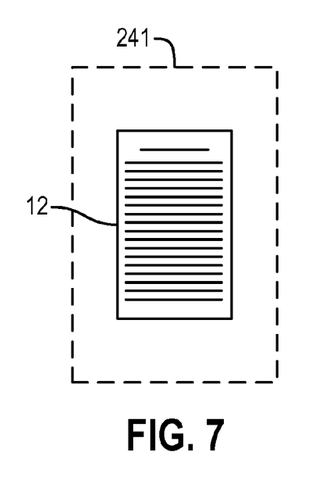
FIG. 7 illustrates a first representative scope encompassed by a robust pointer when emphasizing a first set of features within the sketch for a source document.
Figure 8:
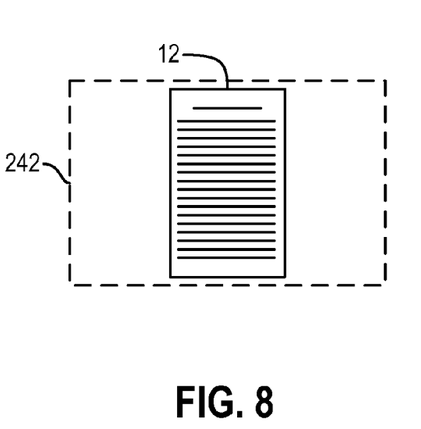
FIG. 8 illustrates a second representative scope encompassed by a robust pointer when emphasizing a second set of features within the same sketch for the source document.

The initial assignment of the individual emphases (e.g., weights) preferably depends on the particular embodiment and is made by the policymaker 114 and/or by pointer generator 37. For example, in one embodiment policymaker 114 is provided with a list of representative elements in the source document 10 and asked to score or rank them as to importance; such scores or ranks are then used directly or modified (e.g., according to a predetermined function) by pointer generator 37. Alternatively, in certain embodiments pointer generator 37 makes the initial assignment based on sample documents (e.g., provided by the policymaker 114) or using default values (e.g., weighting all representative elements equally or weighting them based on infrequency of occurrence in a selected lexicon). In any event, such emphases preferably are automatically modified by pointer generator 37 over time, using a machine-learning process as new samples are obtained, in order to refine the matching criterion 35.

In still further embodiments, a combination of the foregoing approaches is used. For example, in one embodiment the policymaker 114 selects an overall level of closeness and pointer generator 37 assigns or at least modifies the emphases on an automated basis.

Generally speaking, the foregoing techniques attempt to identify documents that are similar to each other. By specifying a high enough degree of similarity, there will be a high likelihood that the documents are related to each other by a derivation process, e.g., that one was derived from the other or that both were derived (at least in part) from a common document. That is, with a high enough degree of required similarity, it will be statistically unlikely (or highly unlikely) that the documents were created entirely independently, even though an estimate of the actual probability of independent creation often is not explicitly calculated.

Finally, it should be noted that similarity need not always be the relationship that the policymaker 114 wishes to specify. For example, in some cases the policymaker 114 might want the policy 40 to cover target documents that are substantially different in some particular respect than the source document 10, or that are complementary to the source document 10 in some particular respect (e.g., similar in some respects but different in others). Accordingly, in such cases, the more general question is, "What is the required relationship between the sketch 12 for the source document 10 and the sketch for any matching target document?" This question preferably is addressed using techniques similar to those described above. For example, if the desired relationship is "substantially different", then the matching criteria might be no more than one or two terms in the documents' representative lists can overlap. Similarly, negative scores can be applied to some or all features within the sketch.

Returning to FIG. 4, in step 165 a sketch is obtained for a potential target document. Preferably, the first part of this step 165 is to identify a potential target document that is to be evaluated. As noted above, in certain cases all documents in set 128 are evaluated, in which event the documents are simply selected sequentially. Alternatively, the set of documents to be evaluated in a particular circumstance is narrowed by the policy 40 itself. That is, other aspects of the applicability of policy 40 might limit the set of documents (e.g., to potential target documents in a specified directory). In one specific example, the policy 40 has been triggered by an attempt to send an e-mail message, the source document is an attachment to the e-mail message, and the potential target documents are specified in the policy. In a second similar example, the policy 40 is triggered by an attempt to send an e-mail message, but in this example the attachment is the target document and multiple source documents 10 are identified in the policy 40.

In this regard, it is noted that in many cases the designation of which document is to be considered the source document and which is to be considered the target document is within the discretion of the policymaker 114. Accordingly, provided that the policy is defined appropriately, it ordinarily can be written in at least two different ways.

Figure 9:
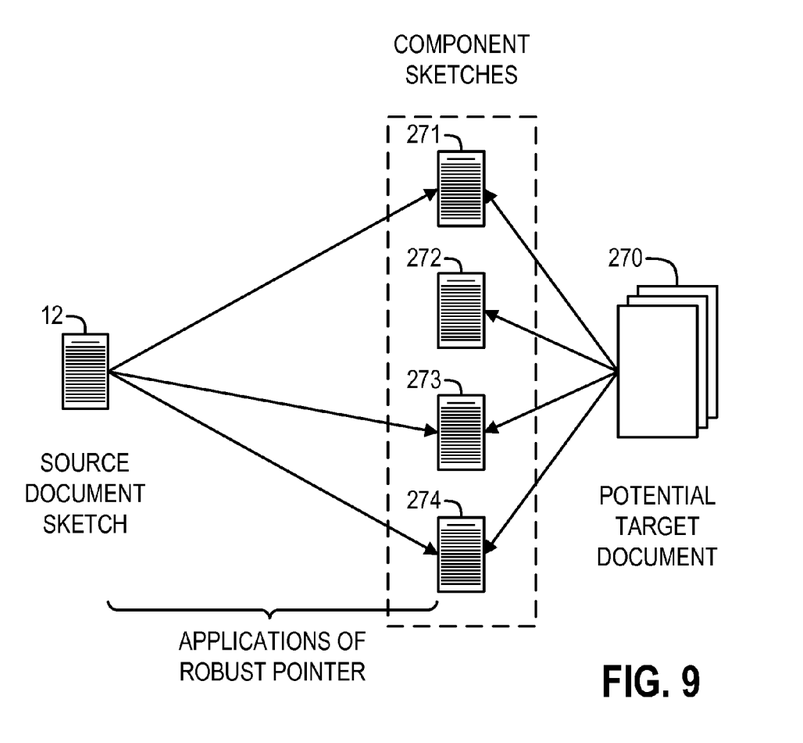
FIG. 9 illustrates application of a robust pointer to multiple component sketches of a potential target document.

The second part of step 165 preferably is to identify the particular sketch to use for the identified potential target document. In most cases, this will be the same type of sketch upon which the matching criterion 35 is based, i.e., the same type of sketch as sketch 12 (e.g., generated in the same manner). In alternate embodiments, as illustrated in FIG. 9, multiple sketches 271-274 will have been generated for different components of the potential target document 270. In such a case, the matching criterion 35 preferably compares only the sketches 271-274 that are the same type as sketch 12 for source document 10 (e.g., in this case sketches 271, 273 and 274), in order to determine whether the source document 10 or a similar document is included within potential target document 270.

Returning again to FIG. 4, in step 167 the sketch of the potential target document is evaluated to determine whether the matching criterion 35 applies, it being noted that the matching criterion potentially is only a portion of the entire policy applicability. Ordinarily, the matching criterion 35 is evaluated in a straightforward manner, e.g., by comparing features in the two sketches and/or by calculating a score for the sketch of the potential target document and then comparing that score to a specified threshold.

If the robust pointer 35 identifies the document as a matching target document, then any other aspects of the policy's applicability preferably are evaluated to determine whether the policy in fact applies to this document. For instance, in certain embodiments the robust pointer 35 is constructed to have high recall at the cost of poor precision and then subsequently applied aspects of the policy's applicability are used to filter the returned documents to improve precision. For reference, it is noted that precision is the percentage of returned documents that are relevant, i.e. true positives/(true positives+false positives), and recall is the percentage of relevant documents returned, i.e. true positives/(true positives+false negatives).

In step 168, if the policy was found to apply to the current document in step 167, then the action(s) specified in the policy 40 (e.g., providing a notification or blocking an attempted action) is performed. It is noted that provision of a notification in this step 168 does not necessarily mean that the notification is delivered immediately. Rather, e.g., in certain circumstances in certain embodiments, the notification is made available to the intended recipient (preferably, with a notification icon to alert the recipient of its existence), and the recipient can retrieve the notification at a convenient time (e.g., together with other notifications of policy applicability).

In step 170, a determination is made as to whether there are any other documents to be evaluated in the set of potential target documents discussed above. If so, then processing returns to step 165 to evaluate the next potential target document. If not, then processing proceeds to step 172.

In step 172, a determination is made as to whether any additional source documents are specified by the current policy 40. For example, step 172 checks whether policy 40 includes a logical disjunction (e.g., where the policy applies to any documents that are similar to source_1 or source_2). If so, then processing returns to step 162 to evaluate the policy 40 with respect to the next source document. If not, then processing is concluded. It is noted that the policy could specify other kinds of logical combinations (e.g., "all of the source documents", "at least two of the source documents"), in which case step 168 preferably is modified to cause the appropriate iterations through steps 162, 164, 165 and 167 before making a determination as to whether the policy applies.

As noted above, the entire process 160 is automatically repeated for multiple policies within set 112.

In most of the foregoing embodiments, determinations are made as to whether a particular policy is applicable to a potential target document. However, in certain cases, a potential target document is identified first and the desire is to determine whether any policies are applicable to it. For instance, when an e-mail message is about to be sent, it would be desirable to know whether completing the e-mailing operation would violate any existing policies with respect to an attachment to the e-mail message (the attachment being the potential target document). For this purpose, the system preferably includes an index that maps individual source document sketches to the corresponding source documents or to the policies to which they pertain. Accordingly, the sketch for the proposed e-mail attachment preferably is used to query the index in order to return any potentially applicable policies. It is noted that in certain embodiments of the invention, the robust pointer includes both an index mapping sketches to potential target documents and an index mapping sketches to source documents or policies, so as to provide maximum flexibility in identifying applicable policies. In other embodiments, such bi-directional identification of policy applicability is accomplished in other ways, e.g., any of the ways described above.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an optomagnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of determining policy applicability, comprising:

designating a document as a source document representative of a policy to which applicability of a potential target document is to be determined;

responsive to designating the document as the source document representative of the policy, generating, by a processor, a first sketch based on content of the source document, such that the first sketch is not generated until the document is designated as the source document representative of the policy;

defining, by the processor, a matching criterion based on the first sketch;

generating, by the processor, a second sketch based on content of the potential target document;

determining, by the processor, whether the policy applies to the potential target document based on whether the second sketch satisfies the matching criterion, such that whether the policy applies to the potential target document is determined based on the source document insofar as the matching criterion is determined based on the first sketch and insofar as the first sketch is generated based on the content of the source document; and if the policy applies, at least one of (1) automatically providing a notification regarding applicability of the policy and (2) automatically blocking an action so as to prevent a violation of the policy, by the processor, wherein the first sketch is generated in a first manner that is computationally more expensive than a second manner in which the second sketch is generated, wherein the first manner and the second manner are such that the first sketch generated in the first manner is more accurate of the content of the source document than the second sketch generated in the second manner is of the content of the target document, and wherein the first manner and the second manner are such that the first sketch generated in the first manner contains more information than the second sketch generated in the second manner does.

2. A method according to claim 1, wherein the second sketch is smaller than the potential target document.

3. A method according to claim 1, wherein the first sketch comprises a representation of a set of terms included within the source document and the second sketch comprises a representation of a set of terms included within the potential target document.

4. A method according to claim 1, wherein the first sketch is generated based on a hash of content included within the source document and the second sketch is generated based on a hash of content included within the potential target document.

5. A method according to claim 1, wherein the matching criterion specifies a permissible deviation from the first sketch.

6. A method according to claim 1, further comprising a step of querying a policy database using a sketch for selected potential target document so as to identify any policy that is applicable to the selected potential target document.

7. A method according to claim 1, further comprising a step of automatically modifying the matching criterion based on feedback received regarding policy applicability.

8. A method according to claim 1, wherein satisfying the matching criterion indicates a high likelihood that the source document and the potential target document are related to each other by a derivation process.

9. A method according to claim 1, wherein the matching criterion identifies target documents that are similar, in a specified respect, to the source document.

10. A non-transitory computer-readable medium storing computer-executable process steps for determining policy applicability, said process steps comprising:

designating a document as a source document representative of a policy to which applicability of a potential target document is to be determined;

responsive to designating the document as the source document representative of the policy, generating a first sketch based on content of the source document, such that the first sketch is not generated until the document is designated as the source document representative of the policy;

defining a matching criterion based on the first sketch;

generating a second sketch based on content of the potential target document;

determining whether the policy applies to the potential target document based on whether the second sketch satisfies the matching criterion, such that whether the policy applies to the potential target document is determined based on the source document insofar as the matching criterion is determined based on the first sketch and insofar as the first sketch is generated based on the content of the source document; and if the policy applies, at least one of (1) automatically providing a notification regarding applicability of the policy and (2) automatically blocking an action so as to prevent a violation of the policy, wherein the first sketch is generated in a first manner that is computationally more expensive than a second manner in which the second sketch is generated, wherein the first manner and the second manner are such that the first sketch generated in the first manner is more accurate of the content of the source document than the second sketch generated in the second manner is of the content of the target document, and wherein the first manner and the second manner are such that the first sketch generated in the first manner contains more information than the second sketch generated in the second manner does.

11. A computer-readable medium according to claim 10, wherein the second sketch is substantially smaller than the potential target document.

12. A computer-readable medium according to claim 10, wherein the first sketch comprises a representation of a set of terms included within the source document and the second sketch comprises a representation of a set of terms included within the potential target document.

* * * * *